(12) United States Patent
Aikawa et al.

(10) Patent No.: US 8,483,444 B2
(45) Date of Patent: Jul. 9, 2013

(54) APPARATUS FOR INSPECTING AND MEASURING OBJECT TO BE MEASURED

(75) Inventors: Tetsuro Aikawa, Yokohama (JP);
Yoshinori Satoh, Kawasaki (JP);
Tatsuya Oodake, Zushi (JP); Naruhiko Mukai, Yokohama (JP); Hisashi Hozumi, Ota-ku (JP); Yasuhiro Yuguchi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 678 days.

(21) Appl. No.: 12/664,749

(22) PCT Filed: Jun. 13, 2008

(86) PCT No.: PCT/JP2008/060843
§ 371 (c)(1),
(2), (4) Date: Mar. 2, 2010

(87) PCT Pub. No.: WO2008/153127
PCT Pub. Date: Dec. 18, 2008

(65) Prior Publication Data
US 2010/0183197 A1 Jul. 22, 2010

(30) Foreign Application Priority Data
Jun. 15, 2007 (JP) ................................. 2007-159142

(51) Int. Cl.
*G06K 9/00* (2006.01)
(52) U.S. Cl.
USPC .......................................... 382/108; 382/106
(58) Field of Classification Search
USPC ................. 382/100, 103, 106, 108, 145–160,
382/132, 141, 260, 216; 348/47; 250/234;
356/302–303, 490; 378/146, 208, 15, 4, 193,
378/195–198, 20, 62
See application file for complete search history.

(56) References Cited

U.S. PATENT DOCUMENTS

| 5,524,133 | A | * | 6/1996 | Neale et al. ...................... 378/53 |
| 5,598,453 | A | * | 1/1997 | Baba et al. ...................... 378/146 |

(Continued)

FOREIGN PATENT DOCUMENTS

| JP | 59 112207 | 6/1984 |
| JP | 60 125515 | 7/1985 |

(Continued)

OTHER PUBLICATIONS

The Extended European Search Report issued Jul. 12, 2012, in Application No. 08777204.2-2213 / 2163847 PCT/JP2008060843.

*Primary Examiner* — Kim Vu
*Assistant Examiner* — Mehdi Rashidian
(74) *Attorney, Agent, or Firm* — Oblon, Spivak, McClelland, Maier & Neustadt, L.L.P.

(57) ABSTRACT

An apparatus for inspecting and measuring an object to be measured includes: a distance measurement device having a light projector that projects a two-dimensional optical pattern onto a measurement target of the measurement object, imaging devices disposed in a stereoscopic arrangement that image the measurement object, and a driving device that rotates a posture of at least one of the imaging devices to control a parallax angle between the imaging devices; a working distance control device that controls the driving device and adjusts a position at which optical axes of the imaging devices intersect; and a distance calculation device having a correspondence position calculation device that determines a correspondence position at which the same region is imaged among images of the imaging devices, and a distance calculation devices that calculates a distance to the measurement target of the measurement object based on a calculation result of the calculation device.

11 Claims, 12 Drawing Sheets

U.S. PATENT DOCUMENTS

| | | | |
|---|---|---|---|
| 6,005,965 A | 12/1999 | Tsuda et al. | |
| 7,257,237 B1* | 8/2007 | Luck et al. | 382/103 |
| 2003/0002051 A1 | 1/2003 | Cohn | |
| 2006/0044448 A1 | 3/2006 | Kato et al. | |
| 2007/0057946 A1 | 3/2007 | Albeck et al. | |
| 2010/0142798 A1* | 6/2010 | Weston et al. | 382/141 |
| 2010/0172567 A1* | 7/2010 | Prokoski | 382/132 |
| 2012/0051588 A1* | 3/2012 | McEldowney | 382/103 |

FOREIGN PATENT DOCUMENTS

| | | |
|---|---|---|
| JP | 8 243962 | 9/1996 |
| JP | 9 318351 | 12/1997 |
| JP | 10 227623 | 8/1998 |
| JP | 2001 194127 | 7/2001 |
| JP | 2001 208522 | 8/2001 |
| JP | 2003 121126 | 4/2003 |
| JP | 2004 077262 | 3/2004 |
| JP | 2005 326324 | 11/2005 |
| JP | 2006 078291 | 3/2006 |
| JP | 2006 285183 | 10/2006 |
| JP | 2007 120993 | 5/2007 |

\* cited by examiner

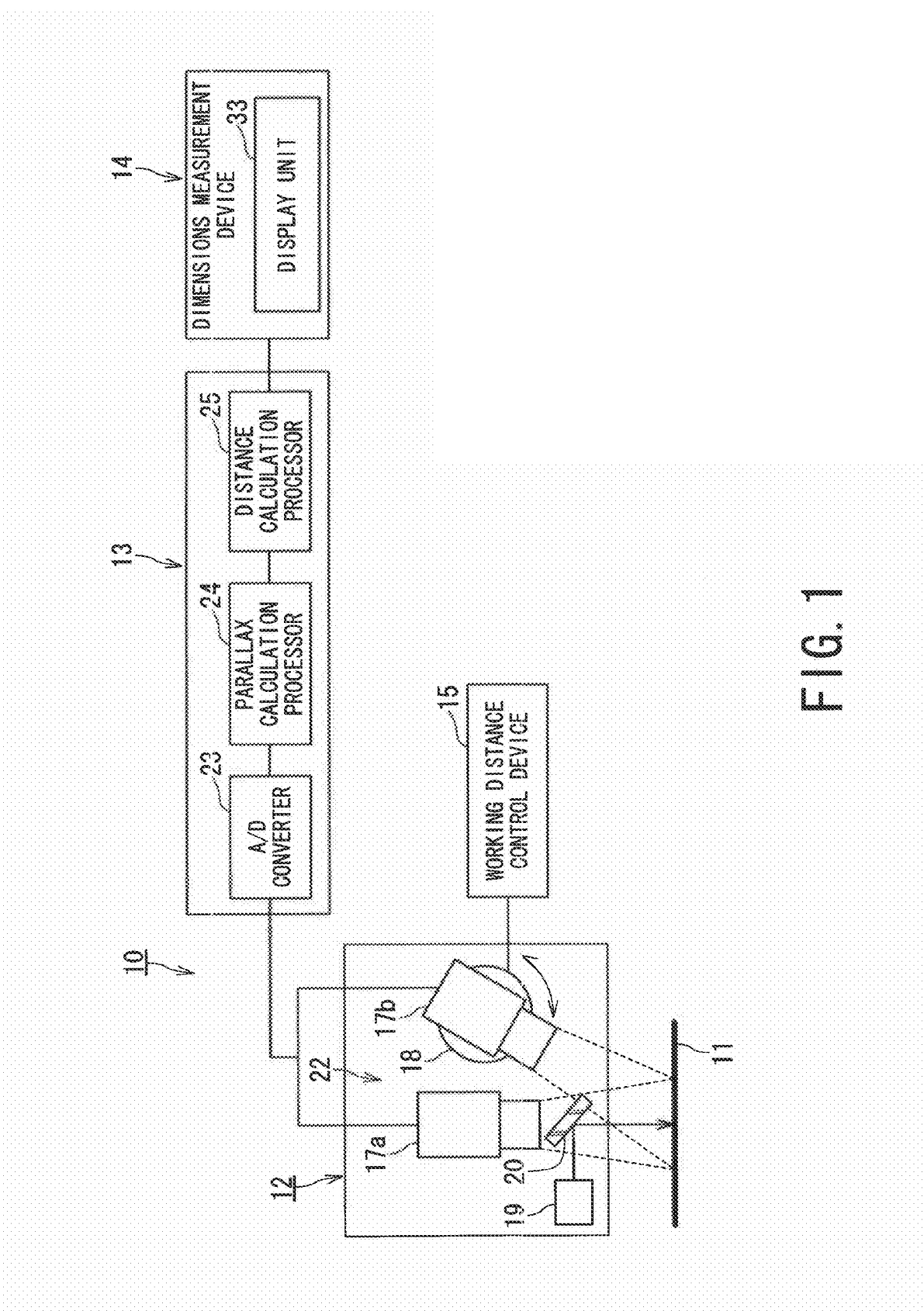

APPARATUS FOR INSPECTING AND MEASURING OBJECT TO BE MEASURED

TECHNICAL FIELD

The present invention relates to three-dimensional inspection and/or measurement technology that is designed to maintain the safety and reliability of objects to be measured such as various devices at a nuclear power plant. More particularly, the present invention relates to an apparatus (hereinafter, which will be simply referred to as "inspection and measurement apparatus") for inspecting and measuring an object to be measured, and three-dimensionally measuring the three-dimensional dimensions, position, and shape of an object to be measured such as various devices or internal components (hereinafter, which will be referred to as "reactor internal components") of a reactor of a nuclear power plant and of an object to be measured after installation thereof.

BACKGROUND ART

In order to maintain the safety and reliability of devices at a nuclear power plant as well as the reactor internal components, each device and the reactor internal components are periodically inspected. Of these inspections, inspection of the reactor internal components is performed by indirect visual inspection by displaying a video image captured by an underwater TV camera or by a TV camera housed in a watertight case on a monitor at the inspection site, and having a skilled and experienced inspector visually check the video images on the monitor. Further, at a nuclear power plant, when work is performed to replace a device or a reactor internal component due to aged deterioration or damage, it is necessary to measure whether or not the position of the device after installation is correct.

However, since work to replace the device or the reactor internal component is performed using indirect visual observation and a target surface of relevant devices or the reactor internal components is checked using a video image that is displayed on a monitor, three-dimensional (3D) information cannot be obtained. When a pattern that appears to be a defect is present on the target surface of the device or the reactor internal components, it is difficult to judge whether the pattern is damage or a defect that has irregularities or is a pseudo pattern on the target surface, and a large amount of time and labor is required for this judgment.

Further, with respect to positional measurement after installation of a device or a reactor internal component of a nuclear power plant, a large amount of time and labor are required in order to measure the three-dimensional position of the devices or the reactor internal components based on a two-dimensional video image on a monitor.

In a conventional nuclear power plant, methods for acquiring three-dimensional information regarding the target surface of respective devices or the reactor internal components include the use of a stereoscopic apparatus that utilizes two cameras. Further, attempts are also being made to apply an inspection and measurement apparatus according to the principles of triangulation by using an optical measurement apparatus that utilizes one camera and a laser beam.

The conventional apparatus for inspecting and measuring has advantages and drawbacks with respect to dimensional measurement of an object to be measured or shape measurement of a device according to the state of the target surface of the respective devices or the reactor internal components that is the object to be measured. For example, with a stereoscopic apparatus that uses two cameras, it is necessary to correlate the positions at which the same location is imaged in images of two cameras. However, in the case of a target surface such as a metallic luster surface of an object to be measured, since there are no characteristic patterns on the surface it is not possible to appropriately determine a correspondence position among the camera images. Hence, it has been difficult to perform distance measurement such as for measuring the dimensions or shape of an object to be measured.

Further, according to the conventional apparatus for inspecting and measuring, a light section measuring method is available that utilizes a camera and line laser beams as an optical measurement apparatus. The optical measurement apparatus according to this method images with a camera a reflection of a line-shaped laser beam that is irradiated onto a target surface of an object to be measured, and measures irregularities in the target surface of the object to be measured based on a reflection position of the laser beam that appears in the camera image.

However, with a target surface that generates a secondary reflection of a laser beam such as a metallic luster surface of an object to be measured, there are cases in which an appropriate reflection position cannot be determined from a camera image, and distance measurement is therefore difficult. Further, since distance measurement is possible only at a position at which the laser beam is irradiated, there is the problem that it is necessary to minutely scan the laser beam in order to obtain high-density measurement points. Consequently, the measurement operation requires a large amount of time. Another representative measurement method of an optical measurement apparatus is a method in which a two-dimensional optical pattern is projected onto a target surface of an object to be measured, and the target surface onto which the optical pattern is projected is imaged with a camera.

According to this measurement method of an optical measurement apparatus, a known optical pattern that has been projected onto the target surface of the object to be measured is compared with the camera image, and irregularities on the target surface are measured based on a mapping position in the camera image of the optical pattern that is projected onto the target surface.

However, in some cases it is not possible to establish correspondence between an optical pattern projected onto a target surface of an object to be measured and a known optical pattern because the optical pattern is affected by the pattern of the target surface. Consequently, distance measurement is difficult since mapping positions cannot be obtained with the camera image.

Further, a common issue for conventional measurement apparatuses is that because the position of a camera or a laser beam or the like is fixed, it is necessary to keep a measurement distance between a measurement target and a measurement apparatus constant. Therefore in an environment in which a measurement apparatus is operated remotely, such as when inspecting a reactor internal component, there is the problem that, from an operability viewpoint, the measurement operation requires a large amount of time.

DISCLOSURE OF THE INVENTION

The present invention has been made in consideration of the above described circumstances, and an object of the invention is to provide an inspection and measurement apparatus that is capable of measuring three-dimensional dimensions and shapes simply and exactly over a wide range from dimensional measurement of defects or damage of an object to be measured up to positional measurement thereof.

An apparatus for inspecting and measuring an object to be measured of the present invention that is provided to solve the above described problems comprises:

a distance measurement device includes a light projection unit that projects a two-dimensional optical pattern onto a measurement target of an object to be measured, a plurality of imaging units, disposed in a stereoscopic arrangement that image the measurement target of the object to be measured, and a driving unit configured to rotate a posture of at least one of the imaging units to control a parallax angle between the imaging units;

a working distance control device that controls the driving unit and adjusts a position at which optical axes of the imaging units intersect; and a distance calculation device includes a correspondence position calculation unit that determines a correspondence position at which the same region among images of the imaging units disposed in a stereoscopic arrangement is imaged, and a distance calculation unit that calculates a distance to a measurement target of an object to be measured based on a calculation result of the calculation unit.

According to the above described preferred embodiment of the invention, preferably a bandpass filter with which a transmitted wavelength is selected in accordance with a wavelength of light that is projected from the light projection unit is provided on an object to be measured side of the imaging unit.

Further, preferably the working distance control device controls the driving unit so that the optical axes of the imaging units intersect at a surface of the measurement target of the object to be measured, and a field of view range of the imaging unit is adjusted in accordance with a distance between the measurement target of the object to be measured and the distance measurement device.

Furthermore, preferably the distance measurement device includes a working distance sensor that performs a point measurement with respect to a distance between the measurement target of the object to be measured and the distance measurement device, and the working distance control device automatically controls the driving unit according to a distance that is measured with the working distance sensor.

The apparatus for inspecting and measuring an object to be measured according to the present invention may further comprise a memory device which stores correlation data with respect to a correlation between a parallax angle between the imaging units and focal lengths of lenses of the imaging units, and the working distance control device controls focal lengths of the lenses based on the correlation data in accordance with a parallax angle between the imaging units, and the distance calculation device calculates a distance to the measurement target of the object to be measured based on a parallax angle between the imaging units and focal lengths of the lenses that are controlled in accordance with the parallax angle.

Preferably, lenses of the imaging units are fluid lenses with which a focal position can be adjusted by electrical characteristics, and the apparatus for inspecting and measuring an object to be measured further comprises a fluid lens adjustment unit that adjusts the fluid lenses of the two imaging units disposed in a stereoscopic arrangement with a single electrical signal.

Preferably the apparatus for inspecting and measuring an object to be measured further comprises a dimensions measurement device that measures dimensions along a surface of a measurement target of the object to be measured based on a calculation result calculated by the distance calculation device.

Further, the distance measurement device may also includes a posture measurement unit that measures a position and an angle thereof, and the distance measurement device converts a result measured at a different position into relative coordinates based on a position and an angle of the distance measurement device that are measured with the posture measurement unit, and measures dimensions of a measurement target of the object to be measured that does not fit within one field of view of the distance measurement device.

An apparatus for inspecting and measuring an object to be measured according to another embodiment of the present invention comprises:

a distance measurement device includes a light projection unit that projects a two-dimensional optical pattern onto a measurement target of an object to be measured, one imaging unit that images the measurement target of the object to be measured, an optical scanning unit that guides light from the measurement target of the object to be measured along a plurality of scanning light paths, and a driving unit that drivingly controls a reflection mirror provided in each scanning light path of the optical scanning unit;

a working distance control device that controls the driving unit to rotate a posture of the reflection mirror to arbitrarily adjust a parallax angle between the scanning light paths; and a distance calculation device that has a correspondence position calculation unit that determines a correspondence position at which is imaged the same region among images of the imaging unit from the respective scanning light paths, and a distance calculation unit that calculates a distance to a measurement target of an object to be measured based on a calculation result of the correspondence position calculation unit.

According to this embodiment, preferably the optical scanning unit comprises a shielding unit that controls transmittance and shielding of light on each scanning light path, and is set so as to switch between transmittance and shielding of light to be input to the imaging unit on each scanning light path by means of the shielding unit.

Preferably, on an object to be measured side of the imaging unit, a bandpass filter is provided with which a transmitted wavelength is selected in accordance with a wavelength of light that is projected from the light projection unit.

Further, preferably the working distance control device controls the driving unit so that the optical axes of the imaging unit intersect at a surface of the measurement target of the object to be measured, and a field of view range of the imaging unit is adjusted in accordance with a distance between the measurement target of the object to be measured and the distance measurement device.

An inspection and measurement apparatus according to the present invention that has the above described features can simply and accurately perform measurement over a range from damage or a defect of an object to be measured up to dimensional measurement of an object to be measured, and by projecting an optical pattern onto a measurement target of an object to be measured, can improve the reliability of a distance measurement result. Further, to enable calibration utilizing an optical pattern, the inspection and measurement apparatus according to the present invention can carry out dimensional measurement (distance measurement) of a distance from a distance calculation device to an object to be measured or with respect to the existence/non-existence and size of a defect or damage of an object to be measured accurately and simply in a three-dimensional manner.

BRIEF DESCRIPTION OF THE DRAWINGS

FIG. 1 is a configuration diagram illustrating a first embodiment of an apparatus (first inspection and measurement apparatus) for inspecting and measuring an object to be measured according to the present invention;

BEST MODE FOR CARRYING OUT THE INVENTION

Figure 2A:
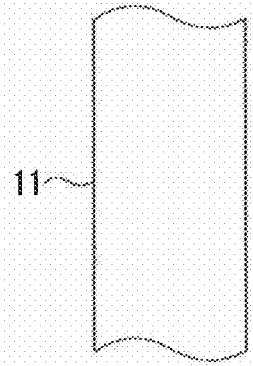
FIG. 2A, FIG. 2B, and FIG. 2C are views that respectively illustrate examples of a camera image of an optical pattern projection to a measurement target of an object to be measured in the first embodiment of the inspection and measurement apparatus according to the present invention.

Embodiments of the apparatus for inspecting and measuring an object to be measured according to the present invention will now be described referring to the attached drawings.

The apparatus for inspecting and measuring an object to be measured takes respective devices of a nuclear power plant and reactor internal components of a nuclear reactor as a measurement target (inspection target) of an object to be measured, and functions as a reactor core internal dimensions measurement device or a distance measurement device that is capable of measurement underwater.

First Embodiment

FIG. 1 is a block diagram of a configuration example of the first embodiment of the apparatus (hereinafter, which will be simply referred to as "first inspection and measurement apparatus") for inspecting and measuring an object to be measured according to the present invention. The first embodiment of the inspection and measurement apparatus illustrates a case of application to, for example, a reactor core internal dimensions measurement device of a nuclear reactor at a nuclear power plant.

A first inspection and measurement apparatus 10 comprises a distance measurement device 12 that images an object (hereinafter, which will be referred to as "measurement object") 11 to be measured as a measurement target or an inspection target, a distance calculation device 13 that calculates a distance between the measurement object 11 and the distance measurement device 12 based on an image from the distance measurement device 12, a dimensions measurement device 14 that measures dimensions (position and shape) of the measurement object 11 based on the calculation result of the calculation device 13, and a working distance control device 15.

The distance measurement device 12 comprises a plurality of cameras, for example, two cameras 17a and 17b, that are stereoscopically arranged so that optical axes thereof intersect at an inspection (measurement) surface of the measurement object 11, a camera driving device 18 having a driving mechanism that rotatingly drives the posture of the camera 17b, a light projector 19 that irradiates a two-dimensional (2D) optical pattern with a light such as a laser beam, and a half mirror 20 that projects onto the measurement object 11 an optical pattern that is irradiated along an optical axis of the camera 17a with the light projector 19. The half mirror 20 is disposed at the front (measurement object 11 side) of the camera 17a, and has a light projection apparatus together with the light projector 19.

According to the first inspection and measurement apparatus 10, in order to reduce the size of the distance measurement device 12 the camera (sensor) driving device 18 is provided that rotates a posture of one of the two cameras 17a and 17b that are stereoscopically arranged. However, a configuration may also be adopted in which the camera (sensor) driving device 18 is provided in each of the two cameras 17a and 17b, and the postures of the two cameras are rotatingly driven.

According to the first inspection and measurement apparatus 10, the half mirror 20 is provided between the camera 17a and the measurement object 11. An optical pattern irradiated with the light projector 19 such as a laser projector is projected onto the measurement object 11 along an optical axis of the camera by the half mirror 20 provided at the front of the camera 17a. By adopting this configuration, even when a distance between the distance measurement device 12 and the measurement object 11 changes, an optical pattern can always be projected within the field of view of the camera 17a. Although according to the first inspection and measurement apparatus 10, a two-dimensional optical pattern is projected using a laser beam that can irradiate a uniform light, a configuration may also be adopted that uses LED illumination or a commonly used halogen illumination or the like.

In the distance measurement device 12, a single distance measurement sensor 22 is comprised by, for example, the two cameras 17a and 17b that are stereoscopically arranged, and the camera driving device 18 that controls the camera posture to adjust a parallax angle and a distance with respect to the two cameras 17a and 17b. A sensor signal from the distance measurement sensor 22 is input to the distance calculation device 13. The distance calculation device 13 performs dimensional measurement of a defect or damage of the measurement object 11, or performs distance measurement of the device shape of the measurement object 11.

The distance calculation device 13 comprises an A/D converter 23 that receives a sensor signal from the distance measurement sensor 22 and subjects the sensor signal to A/D conversion; a parallax calculation processor 24 that subjects the digital signal that has undergone A/D conversion to signal processing, and establishes a correlation between positions at which the same region is imaged (mapped) among images of, for example, the two cameras 17a and 17b that are stereoscopically arranged; and a distance calculation processor 25 that calculates a distance to the measurement object 11 based on the relative positions and postures and the like of the two cameras 17a and 17b, based on a calculation result from the parallax calculation processor 24.

Further, a reactor core internal inspection apparatus is configured by the distance measurement sensor 22 of the distance measurement device 12, the distance calculation device 13 that performs a distance measurement based on a sensor signal from the distance measurement sensor 22, and the working distance control device 15 that controls the driving device 18 of the distance measurement sensor 22 and adjusts a working distance from the distance measurement sensor 22 to the measurement object 11.

The first inspection and measurement apparatus 10 as shown in FIG. 1, the first inspection and measurement apparatus 10 measures the dimensions and distance of the measurement object 11 using a plurality of cameras, for example, two cameras 17a and 17b, that are stereoscopically arranged. The first inspection and measurement apparatus 10 controls a viewing angle of, for example, the two cameras 17a and 17b that are stereoscopically arranged, and a distance between the cameras 17a and 17b. The first inspection and measurement apparatus 10 can perform measurement with a single distance measurement sensor over a wide range from dimensional measurement of a defect or damage of the measurement object 11 at a narrow-angle field of view to dimensional measurement of a device shape at a wide-angle field of view.

Next, operations of the apparatus 10 for inspecting and measuring an object to be measured the measurement object 11 are described.

The distance measurement device 12 comprised by the first inspection and measurement apparatus 10 is mounted on an unshown underwater robot or the like, and is transported to and disposed at an imaging position of the measurement object 11 such as a relevant device or a reactor internal component by the underwater robot. At this time, a distance between the measurement object 11 and the distance measurement device 12 is adjusted and measured according to the dimensions, shape, and position of the measurement object 11.

For example, when minute dimensional measurements of a defect or damage of the measurement object 11 are required, the distance measurement device 12 is disposed at a position that is close to the measurement object 11, so as to enable enlarged imaging of the measurement object 11 with the stereoscopically arranged cameras 17a and 17b. Further, when it is required to perform measurement of a wide area on the measurement object 11, such as measurement of the dimensions or shape of a device, the distance measurement device 12 is disposed at a position that is at a distance from the measurement object 11, so as to enable imaging of a wide area of the measurement object 11 with the cameras 17a and 17b.

The first inspection and measurement apparatus 10 also comprises the working distance control device 15. The control device 15 controls the sensor (camera) driving device 18 according to operations of an operator or the like, and rotates the posture of the camera 17b to adjust the camera parallax angle between the cameras 17a and 17b so that the camera optical axis of the camera 17a and the camera optical axis of the camera 17b intersect at the surface of the measurement object 11.

A two-dimensional optical pattern is irradiated in a radial shape from the light projector 19. The optical pattern is projected onto the measurement object 11 along the optical axis of the camera 17a via the half mirror 20 provided at the front (measurement object 11) side of the camera 17a. By setting the illuminating angle of the light projector 19 to be wider than the viewing angle of the cameras 17a and 17b, no matter what the distance is between the measurement object 11 and the distance measurement device 12, an optical pattern can be projected onto the entire surface of the measurement object 11 within the field of view of the cameras 17a and 17b.

Figure 2B:
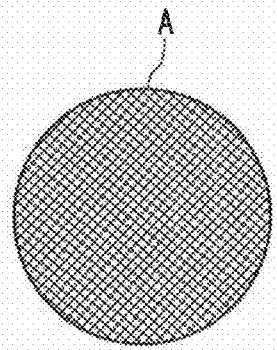
Figure 2C:
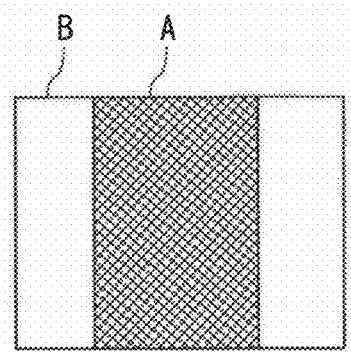

The stereoscopically arranged cameras 17a and 17b of the distance measurement device 12 image the measurement object 11 on which the optical pattern is projected, and output the image to the distance calculation device 13. FIG. 2 illustrates examples of images captured by a camera that has imaged the measurement object 11 onto which the optical pattern is projected. FIG. 2A is an example of an image of the measurement object 11. FIG. 2B is an example of an image of an optical pattern A that is projected by the light projector 19. FIG. 2C is an example of an image of a camera image B of the measurement object 11 onto which the optical pattern A has been projected. Although there is no characteristic pattern on the surface of the measurement object 11, by projecting the optical pattern A onto the measurement object 11, the surface of the measurement object 11 that has been given a characteristic pattern can be mapped on the camera image 13.

Figure 3A:
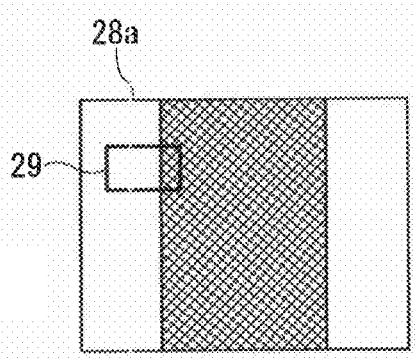
FIG. 3A and FIG. 3B are views that respectively explain an image processing method of a parallax calculation processor of a distance calculation device according to the first embodiment of the inspection and measurement apparatus according to the present invention.
Figure 3B:
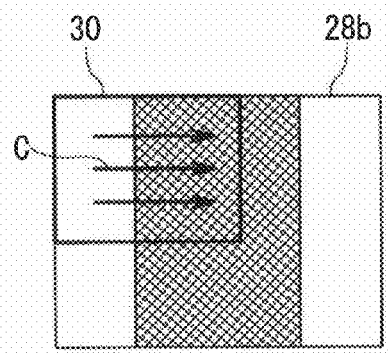

At the distance calculation device 13, camera images 28a and 28b of the two cameras are compared using camera image processing by the parallax calculation processor 24, and correlation of positions at which the same region is mapped between the camera images 28a and 28b is performed. FIGS. 3A and 3B are views of explaining a method that correlates mapping positions of the same region between the camera image 28a and the camera image 28b.

The parallax calculation processor 24 (see FIG. 1) sets a rectangular comparison block 29 in the camera image 28a shown in FIGS. 3A and 3B, and sets a comparison region 30 in the camera image 28b. The parallax calculation processor 24 performs a comparison scan C while shifting by one pixel at a time a position for successive comparison from the left upper portion to the right lower portion in the images for the comparison block 29 with respect to the comparison region 30, and executes matching processing using the correlation between the brightness at each position. The parallax calculation processor 24 retrieves a position with the highest correlation value among the correlation values of the matching processing that is executed at each position, and determines a correspondence position within the comparison region 30 at which the same region as the comparison block 29 is mapped. The parallax calculation processor 24 sets the comparison block 29 and the comparison region 30 for each pixel of the camera image 28a and repeats the same processing. As a result, the parallax calculation processor 24 determines correspondence positions of the camera image 28b with respect to all pixels of the camera image 28a.

Further, the distance calculation processor 25 of the distance calculation device 13 shown in FIG. 1 converts correspondence positions between the camera images 28a and 28b (see FIGS. 3A and 3B) that are determined with the parallax calculation processor 24 into a distance between the distance measurement device 12 and the measurement object 11 using the principles of triangulation, based on a parallax angle according to the relative positions and postures of the two cameras 17a and 17b. More specifically, when the relative positions between the stereoscopically arranged cameras 17a and 17b are fixed, rotational information of the camera driving device 18 serves as the parallax angle, and the distance can be converted using the principles of triangulation.

Figure 4:
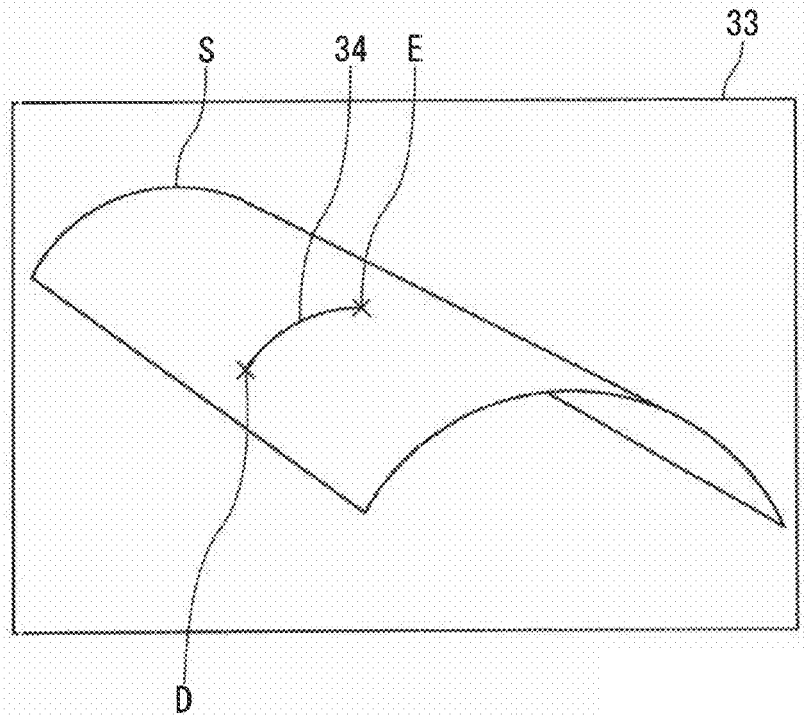
FIG. 4 is an explanatory view of a dimensions measurement device according to the first embodiment of the inspection and measurement apparatus according to the present invention.
Figure 5:
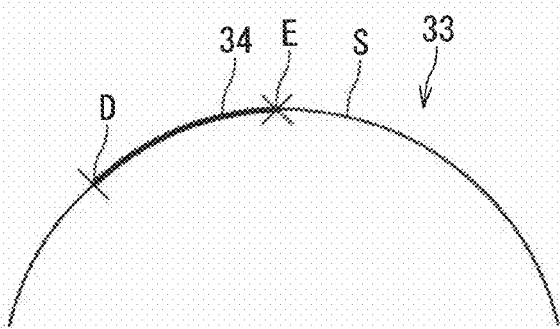
FIG. 5 is an explanatory view illustrating a measurement method of a dimensions measurement device according to the first embodiment of the inspection and measurement apparatus according to the present invention.

The dimensions measurement device 14 comprises a display unit 33 that three-dimensionally displays a surface shape S of the measurement object 11 based on the measurement result of the distance calculation device 13 as shown in FIG. 4. The configuration is such that the operator can designate positions at two points at which the operator wishes to perform the dimensional measurement. The dimensions measurement device 14 performs dimensional measurement along the three-dimensional surface shape S of the measurement object 11 between positions D and E as the two points designated by the operator for the dimensional measurement. As a result, the actual dimensions or the like of damage or a defect 34 that has occurred on the measurement target surface of the measurement target which is a part of the measurement object 11 as can be accurately measured. Further, although in FIG. 4 and FIG. 5 the designated positions for dimensional measurement of the measurement object 11 are described as the two points D and E, positions at more than two points may be shown.

According to the first inspection and measurement apparatus 10 illustrated in the present embodiment, stereoscopically arranged cameras 17a and 17b are set in the distance measurement device 12, and by controlling the postures of the cameras with the camera (sensor) driving device 18, it is possible to perform dimensional (distance) measurement and shape measurement three-dimensionally from a defect or damage of the measurement object 11 up to measurement of the shape of the device itself with the single distance measurement sensor 22.

Further, by projecting an optical pattern onto a target surface of the measurement object 11 utilizing the light projector 19 such as a laser beam, it is possible to perform three-dimensional measurement of dimensions and distance, and the reliability of a distance measurement result can be enhanced.

According to the conventional apparatus for inspecting and measuring, there is the risk that the measurement accuracy will be affected by a deviation occurring in the positional relationship between cameras due to rattling of a driving apparatus that controls the camera posture. However, the first inspection and measurement apparatus 10 of the present embodiment comprises a light projector 19, and enables calibration of camera positions utilizing an optical pattern that is irradiated with the light projector 19. It is therefore possible to perform measurement in which the positional relationship between cameras is corrected. More specifically, an optical pattern of two-dimensionally arrayed dots is irradiated onto a flat object, and calibration of cameras is performed in the same manner as the conventional method utilizing an optical pattern.

According to the first inspection and measurement apparatus 10, a total of three measurement results are obtained by means of an optical pattern that is projected onto the target surface of the measurement object 11 from the light projector 19. The three measurement results include a measurement result for the distance between the two stereoscopically arranged cameras 17a and 17b, and measurement results for the distance between the optical pattern and each camera. By judging the three distance measurement results in an overall manner, dimensional measurement of a defect or damage of the measurement object 11 or dimensional measurement of the device shape can be measured exactly and precisely. By controlling the parallax angle for two cameras that are stereoscopically arranged or controlling a distance between the cameras, it is possible to perform measurement over a wide range from dimensional measurement of an object to be measured at a narrow-angle field of view to dimensional measurement of a device shape at a wide-angle field of view with the single distance measurement sensor 22.

Second Embodiment

A second embodiment of the apparatus for inspecting and measuring an object to be measured according to the present invention will now be described referring to FIG. 6.

Figure 6:
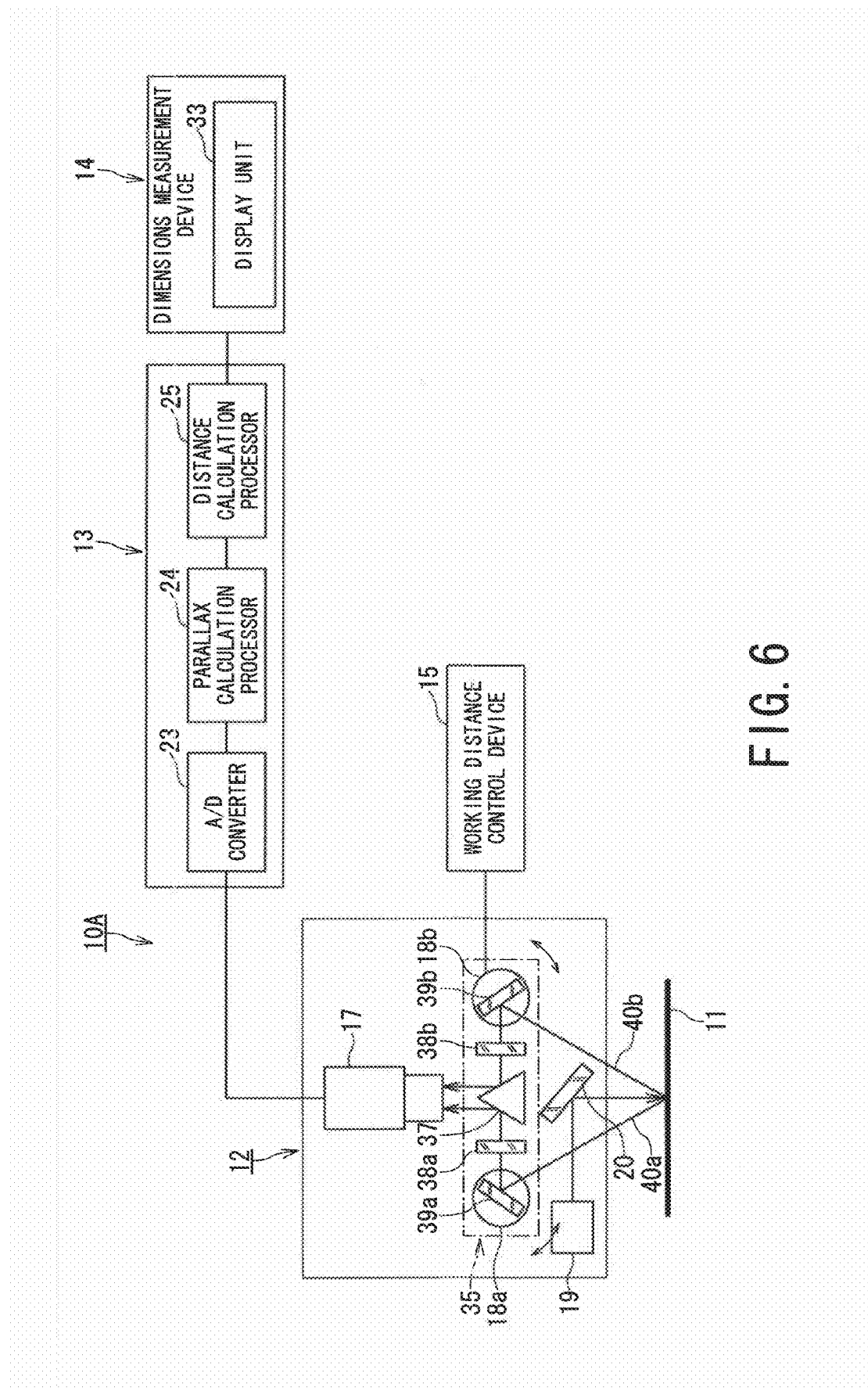
FIG. 6 is a configuration diagram illustrating a second embodiment of the inspection and measurement apparatus (second inspection and measurement apparatus) according to the present invention.

FIG. 6 is a block diagram of a configuration example showing a second embodiment of the apparatus (hereinafter, which will be simply referred to as "second inspection and measurement apparatus") for inspecting and measuring an object to be measured. For the explanation of a second inspection and measurement apparatus 10A described in this embodiment, components that are the same as in the first inspection and measurement apparatus 10 described in the first embodiment are denoted by the same reference numerals, and duplicate descriptions thereof are omitted or simplified.

In contrast to the first inspection and measurement apparatus 10 described in the first embodiment, in the second inspection and measurement apparatus 10A illustrated in the second embodiment the distance measurement device 12 comprises one camera 17 and a mirror optical scanning unit 35.

The mirror optical scanning unit 35 is disposed on the front side of the camera 17, between the camera 17 and the half mirror 20. The mirror optical scanning unit 35 has a prismatic reflection mirror 37 disposed on the front (measurement object 11) side of the camera 17, and a pair of reflection mirrors 39a and 39b disposed via liquid crystal shutters 38a and 38b as shutter mechanisms on both sides of the reflection mirror 37. The pair of reflection mirrors 39a and 39b comprise first reflection mirrors, and the prismatic second reflection mirror 37 is disposed between the first reflection mirrors 39a and 39b. The liquid crystal shutters 38a and 38b are disposed between the first reflection mirrors 39a and 39b that form a pair and the second reflection mirror 37, respectively. The postures of the first reflection mirrors 39a and 39b forming a pair are rotatably controlled by two mirror driving apparatuses that are not shown in the drawings.

The arrangement of the first reflection mirrors 39a and 39b and the second reflection mirror 37 is adjusted so as to guide light from the scanning surface of the measurement object 11 to the camera 17 along a first scanning light path 40a and a second scanning light path 40b to perform scanning. The liquid crystal shutters 38a and 38b are arranged on the first and second scanning light paths 40a and 40b. The liquid crystal shutters 38a and 38b are provided so as to be capable of controlling transmission and shielding of light in accordance with an electrical signal. The transmission and shielding of light is controlled by the liquid crystal shutters 38a and 38b, and light such as laser beams that have been transmitted along the first scanning light path 40a and the second scanning light path 40b is input to the camera 17 while sequentially switching the light.

According to the second inspection and measurement apparatus 10A of the present embodiment, light that passes along the first scanning light path 40a and the second scanning light path 40b is sequentially switched by the liquid crystal shutters 38a and 38b and input to the camera 17. However, a configuration may also be adopted in which light from the first scanning light path 40a and light from the second scanning light path 40b are input at different positions of the camera 17. For example, when a light receiving element comprised by the camera 17 is a rectangular shape, a configuration may be adopted such that, when the vertical centre is taken as a boundary, one side receives light from the first scanning light path 40a and the opposite side receives light from the second scanning light path 40b.

The second inspection and measurement apparatus 10A also comprises the working distance control device 15. The working distance control device 15 controls driving members 18a and 18b of the mirror optical scanning unit 35, and rotates postures of the first reflection mirrors 39a and 39b to adjust the parallax angle of the scanning light paths so that optical axes of the camera 17 on the first scanning light path 40a and the second scanning light path 40b intersect at the surface of the measurement object 11.

According to the second inspection and measurement apparatus 10A described in the second embodiment, it is possible to stereoscopically image the measurement object 11 with a single camera 17, and thereby enable miniaturization and weight reduction of the distance measurement device 12.

In the second inspection and measurement apparatus 10A illustrated in the second embodiment, the distance measurement device 12 has a light projecting member that projects a two-dimensional optical pattern onto a measurement target of the measurement object 11; one imaging member that images the measurement target of the measurement object 11; an optical scanning member that guides light from a measurement target of the measurement object 11 along a plurality of scanning light paths 40a and 40b; and driving members 18a and 18b that drivingly controls the reflection mirrors 39a and 39b that are provided on the respective scanning light paths 40a and 40b of the optical scanning member.

The working distance control device 15 comprising the second inspection and measurement apparatus 10A has a member that controls the driving members 18a and 18b to rotate the postures of the reflection mirrors 39a and 39b and arbitrarily adjust a parallax angle between the scanning light paths 40a and 40b.

Further, the distance calculation device 13 of the second inspection and measurement apparatus 10A has a correspondence position calculation member that determines a correspondence position at which is imaged the same region among images of the imaging member from each of the scanning light paths 40a and 40b; and a distance calculation member that calculates a distance to the measurement target of the measurement object 11 based on the calculation result calculated by the correspondence position calculation member. The distance calculation device 13 can three-dimensionally determine a distance between the distance measurement device 12 and a measurement target of the measurement object 11 in an accurate and simple manner.

Third Embodiment

A third embodiment of the apparatus for inspecting and measuring an object to be measured according to the present invention will now be described referring to FIG. 7 and FIG. 8.

Figure 7:
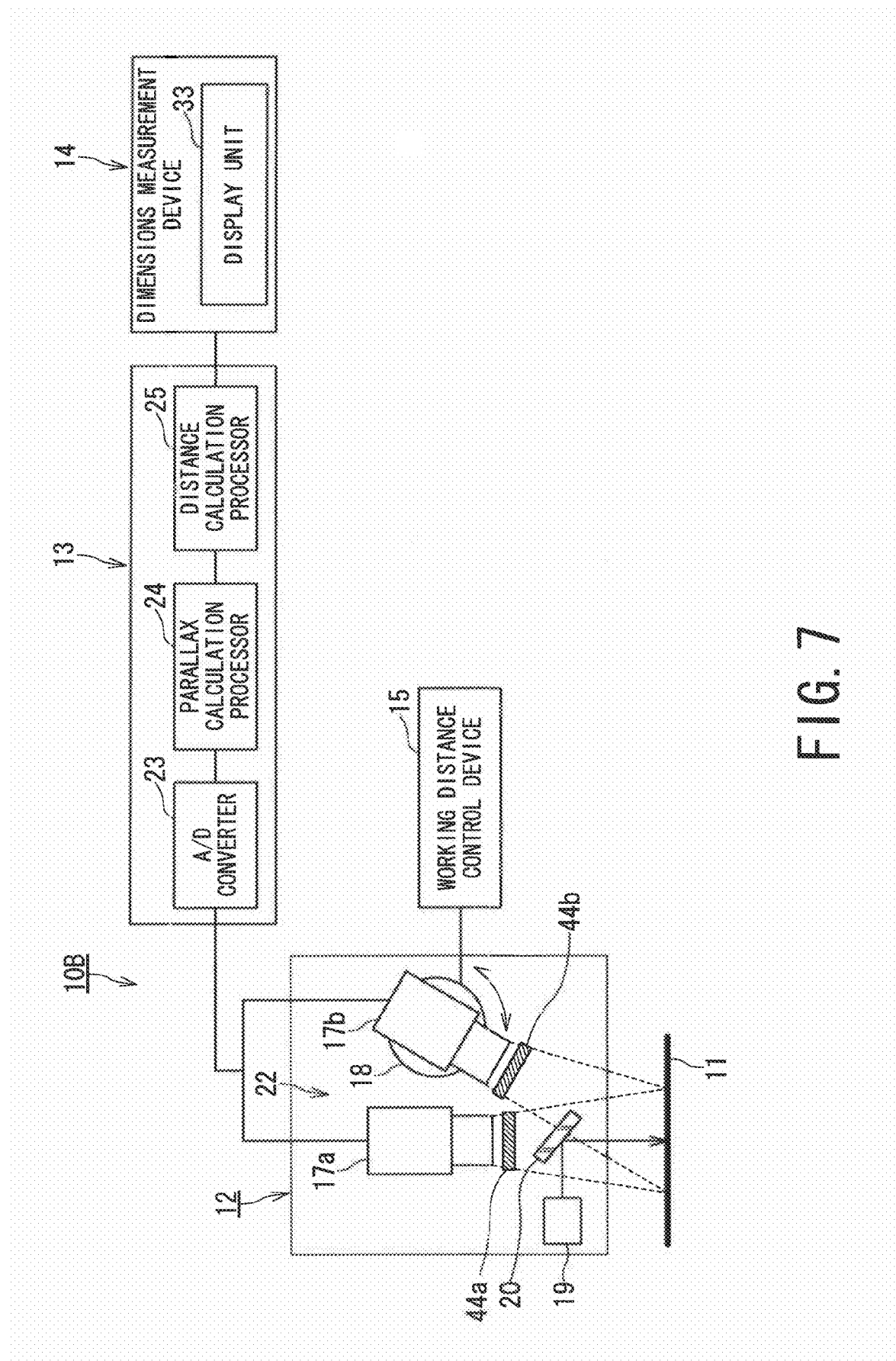
FIG. 7 is a configuration diagram illustrating a third embodiment of the inspection and measurement apparatus (third inspection and measurement apparatus) according to the present invention.

FIG. 7 is a block diagram of a configuration example that illustrates the third embodiment of the apparatus (hereinafter, which will be simply referred to as "third inspection and measurement apparatus") for inspecting and measuring an object to be measured. For the explanation of a third inspection and measurement apparatus 10B of this embodiment, components that are the same as in the apparatus for inspecting and measuring 10 shown in the first embodiment are denoted by the same reference numerals, and duplicate descriptions thereof are omitted or simplified.

The third inspection and measurement apparatus 10B illustrated in FIG. 7 has a plurality of cameras, for example, two cameras 17a and 17b that are provided in the distance measurement device 12. Bandpass filters 44a and 44b are additionally provided on the front side of the cameras 17a and 17b. The bandpass filters 44a and 44b can allow transmission of only a wavelength of light such as a laser beam that is of a fixed wavelength. A wavelength that can pass through the bandpass filters 44a and 44b is set to be approximately the same as a wavelength that is irradiated onto the target surface of the measurement object 11 through the half mirror 20 from the light projector 19. The bandpass filters 44a and 44b may also be provided instead of, for example, the shutter mechanism (liquid crystal shutters 38a and 38b) shown in FIG. 6.

Next, the operation of the third inspection and measurement apparatus 10B shown in FIG. 7 is described.

A two-dimensional optical pattern is irradiated in a radial shape from the light projector 19 of the distance measurement device 12. The irradiated light is guided onto a target surface of the measurement object 11 via the half mirror 20. The optical pattern from the light projector 19 is projected onto the measurement object 11 along the optical axis of the camera 17a by the half mirror 20 that is disposed in front of the camera 17a.

The two stereoscopically arranged cameras 17a and 17b image through the bandpass filters 44a and 44b the measurement object 11 on which the optical pattern is projected, and as a result only the optical pattern projected onto the measurement object 11 is mapped. Camera images in which the optical pattern is mapped are output to the distance calculation device 13 from the distance measurement sensor 22.

Figure 8A:
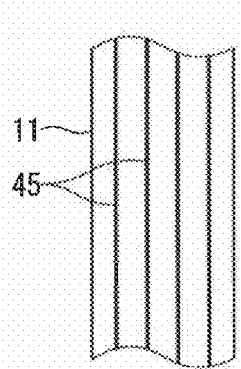
FIG. 8A, FIG. 8B, and FIG. 8C are views that respectively illustrate examples of a camera image of an optical pattern projection onto a measurement target of an object to be measured in the third embodiment of the inspection and measurement apparatus according to the present invention.
Figure 8B:
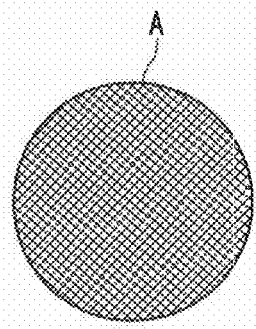
Figure 8C:
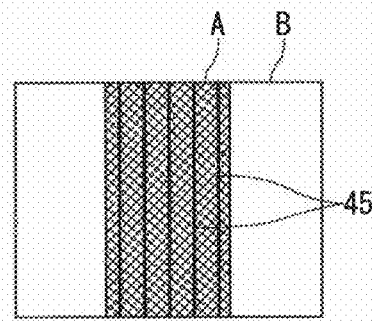

FIG. 8 illustrates an example of a camera image in which the measurement object 11 onto which the optical pattern is projected is imaged without performing the imaging through the bandpass filters 44a and 44b. FIG. 8A illustrates an image in which a vertically-striped pattern 45 formed by surface irregularities of the measurement object 11 is taken as a measurement target. FIG. 8B illustrates an optical pattern A that is projected with the light projector 19. FIG. 8C illustrates a camera image in which the measurement object 11 onto which the optical pattern A is projected has been imaged. As shown in FIG. 8C, in the camera image B, the vertically-striped pattern 45 of the measurement target of the measurement object 11 and the optical pattern A are combined and mapped.

The way in which the surface pattern 45 produced by surface irregularities on the measurement target that is the measurement object 11 is viewed may change according to the manner in which illumination or the like falls thereon. In particular, since the two cameras 17a and 17b are stereoscopically arranged and the observation point positions of the two cameras 17a and 17b are thus different, the circumstances regarding the reflection of illumination are different, and in some cases the way in which the two cameras 17a and 17b view the measurement object 11 is entirely or partially different.

Under these circumstances, even when an optical pattern is projected onto the measurement target of the measurement object 11, the influence of the surface pattern A of the measurement target is significant, and there is the possibility that correlation between images cannot be performed with the parallax calculation processor 24 of the distance calculation device 13, or that an erroneous correlation will occur. Therefore, by imaging the measurement object 11 through the bandpass filters 44a and 44b that allow transmission of the same wavelength as the illumination wavelength of the light projector 19 such as a laser projector, it is possible to eliminate the surface pattern of the measurement object 11 and map only the optical pattern A on a camera image.

Thus, even in a situation in which the way of viewing a surface pattern of the measurement object 11 differs between images of the stereoscopically arranged cameras 17a and 17b, it is possible to accurately measure a distance to a measurement target with the distance calculation device 13 using only the optical pattern A that is projected onto the measurement target of the measurement object 11.

According to the third embodiment, an accurate distance measurement is possible without being affected by the influence of the surface pattern 45 caused by surface irregularities on the measurement target of the measurement object 11. Further, a distance from the camera 17a of the distance measurement device 12 to the measurement target of the measurement object 11 can be three-dimensionally measured with ease and accuracy.

Fourth Embodiment

A fourth embodiment of the apparatus for inspecting and measuring an object to be measured according to the present invention will now be described referring to FIG. 9 and FIG. 10.

Figure 9:
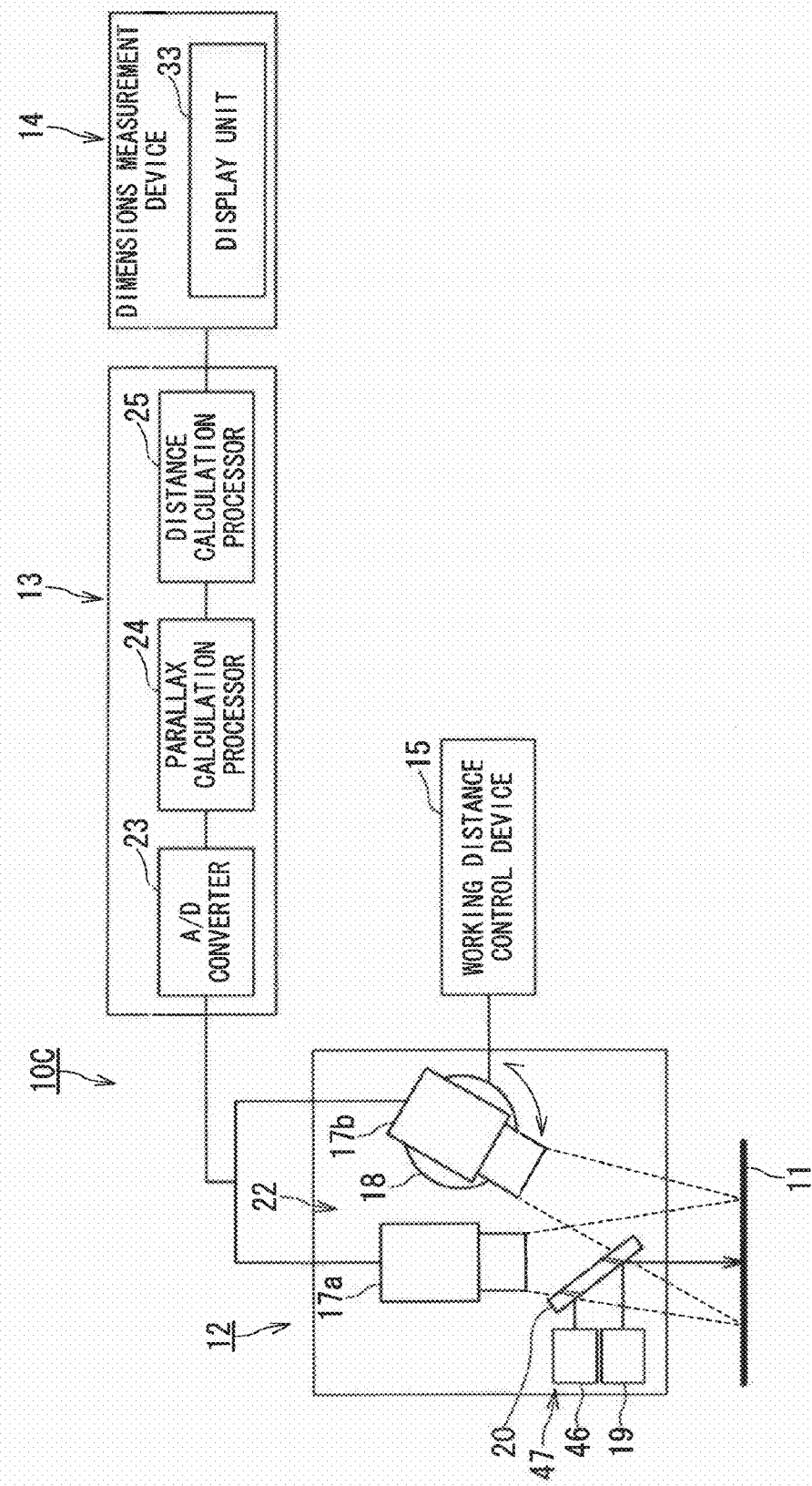
FIG. 9 is a configuration diagram illustrating a fourth embodiment of the inspection and measurement apparatus (fourth inspection and measurement apparatus) according to the present invention.

FIG. 9 is a block diagram of a configuration example illustrating an apparatus (hereinafter, which will be simply referred to as "fourth inspection and measurement apparatus") 10C for inspecting and measuring the measurement object 11 as a fourth embodiment of the present invention. With respect to the fourth inspection and measurement apparatus 10C illustrated in this fourth embodiment, components that are substantially the same as in the first inspection and measurement apparatus 10 described in the first embodiment are denoted by the same reference numerals, and duplicate descriptions thereof are omitted or simplified. The fourth inspection and measurement apparatus 10C shown in FIG. 9 is additionally provided with a working distance sensor 46 in the distance measurement device 12 relative to the first inspection and measurement apparatus 10 shown in FIG. 1.

In the distance measurement device 12, the working distance sensor 46 is arranged in parallel with the light projector 19. The working distance sensor 46 comprises a laser distance meter or the like. For example, the working distance sensor 46 irradiates an irradiation light such as a laser beam onto a target surface (measurement target) of the measurement object 11 via the half mirror 20, and measures a distance based on a time difference between the irradiation time and the time of receiving reflected light that is reflected by and returns from the target surface. A distance measurement unit 47 illustrated in FIG. 10 that combines a laser pointer and image processing may also be considered instead of the working distance sensor 46.

FIG. 10 illustrates a configuration provided with the distance measurement unit 47 which utilizes a laser pointer 48 with the working distance sensor 46. The distance measurement unit 47 combines the laser pointer 48 and image processing, and comprises the working distance sensor 46, the half mirror 20, and the camera 17a.

Figure 10B:
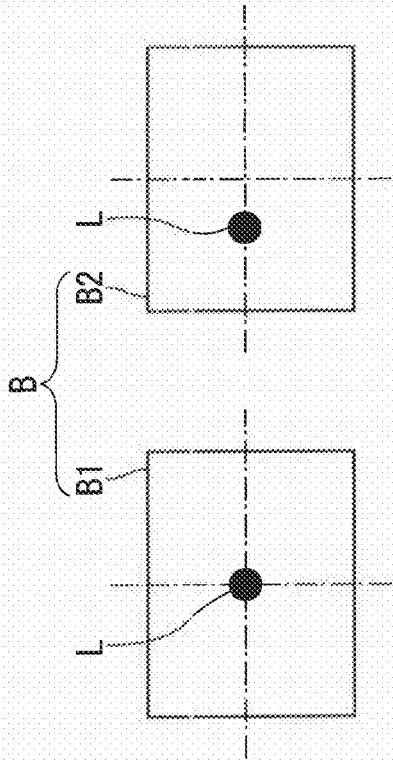
FIG. 10A, FIG. 10B, and FIG. 10C are explanatory views that illustrate the adjustment of the optical axes of a camera according to a fourth embodiment of the inspection and measurement apparatus of the present invention.
Figure 10C:
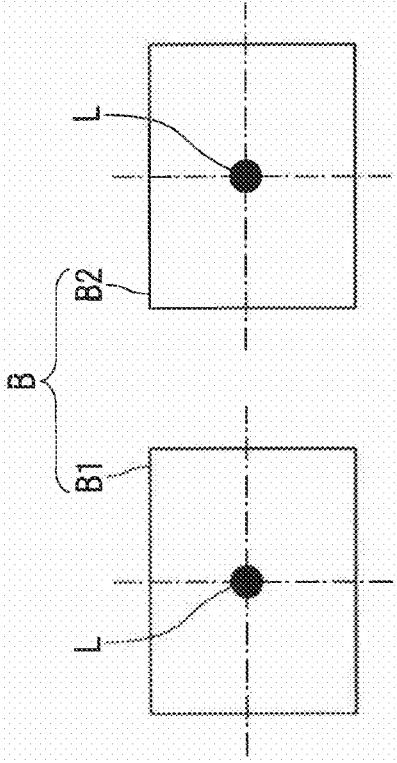
Figure 10A:
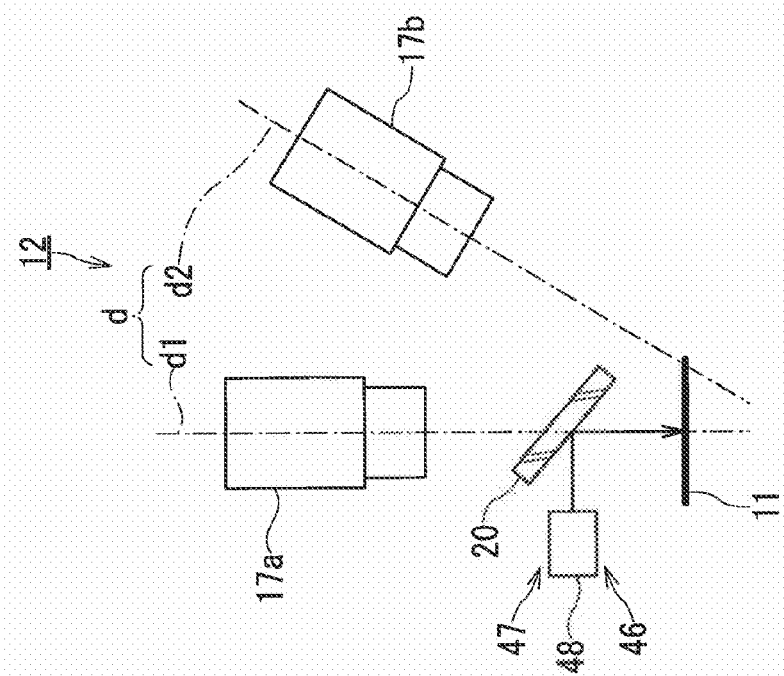

With the laser pointer 48 that is utilized for the working distance sensor 46, a laser beam is illuminated as shown in FIG. 10A onto a measurement target of the measurement object 11 along an optical axis $d_1$ of the camera 17a. FIG. 10B illustrates camera images B ($B_1$, $B_2$) in a case where the camera optical axes d ($d_1$, $d_2$) of the stereoscopically arranged two cameras 17a and 17b do not intersect at the target surface of the measurement object 11. A laser beam L that is mapped onto the camera images B ($B_1$, $B_2$) is mapped at different positions between the camera images $B_1$ and $B_2$ as shown in FIG. 10B.

FIG. 10C illustrates camera images $B_1$ and $B_2$ in a case in which the camera optical axes $d_1$ and $d_2$ of the stereoscopically arranged two cameras 17a and 17b intersect at the target surface (surface of measurement target) of the measurement object 11. In this case, the laser beam L that is mapped onto the camera images $B_1$ and $B_2$ is mapped at the same position in the camera images $B_1$ and $B_2$.

In the fourth inspection and measurement apparatus 10C, by controlling the driving device 18 with the working distance control device 15, the camera viewing angle is automatically adjusted to an optimal state in which the camera optical axis $d_2$ of the camera 17b intersects at the surface of the measurement target of the measurement object 11 with the camera optical axis $d_1$ of the camera 17a, and a distance from the camera 17a of the distance measurement device 12 to the target surface of the measurement object 11 can be accurately and easily measured.

Next, the operation of the fourth inspection and measurement apparatus 10C will be described.

According to the first inspection and measurement apparatus 10 illustrated in FIG. 1, the driving device 18 is controlled with the working distance control device 15 in accordance with an operation of the operator or the like, and the posture of the camera 17b is rotated to adjust the parallax angle so that the camera optical axis of the camera 17a and the camera optical axis of the camera 17b intersect at the surface of the measurement target of the measurement object 11.

In contrast, the fourth inspection and measurement apparatus 10C described in the fourth embodiment comprises the distance measurement unit 47 that includes the working distance sensor 46 provided in the distance measurement device 12, and the laser pointer 48 as a power pointer in the working distance sensor 46.

By means of the laser pointer 48 of the working distance sensor 46 provided in the distance measurement unit 47, a point measurement can be performed with respect to a distance between the distance measurement device 12 and a measurement target of the measurement object 11 inside the camera field of view of the camera 17a.

In accordance with a distance to the measurement target of the measurement object 11, the working distance control device 15 controls the driving device 18 to rotate the posture of the camera 17b and perform automatic adjustment to obtain the optimal camera parallax angle. For example, the working distance sensor 46 irradiates a laser beam, and measures a distance based on a time difference between the irradiation time and the time of receiving light of the laser beam that is reflected by and returns from the measurement target of the measurement object 11.

The distance measurement unit 47 provided in the distance measurement device 12 is a laser distance meter that combines the laser pointer 48 of the working distance sensor 46 and image processing. The distance measurement unit 47 controls operation of the driving device 18 with the working distance control device 15, and rotationally controls the stereoscopically arranged camera 17b. A configuration may also be adopted in which the working distance control device 15 controls operation of respective driving apparatuses 18 of the stereoscopically arranged cameras 17a and 17b to cause the camera optical axes $d_1$ and $d_2$ of the respective cameras 17a and 17b to intersect at the surface of the measurement target of the measurement object 11.

By controlling the driving device 18 with the working distance control device 15 so that the mapping positions of the laser beam L are the same with respect to each of the stereoscopically arranged cameras 17a and 17b, adjustment can be automatically performed to obtain an optimal camera parallax angle at which the optical axis $d_1$ of the camera 17a and the optical axis $d_2$ of the camera 17b intersect at the surface of the measurement target of the measurement object 11.

According to the fourth inspection and measurement apparatus 10C illustrated in the fourth embodiment, it is possible to automatically adjust a parallax angle between the stereoscopically arranged cameras 17a and 17b. Further, a distance measurement to a measurement target of the measurement object 11 can be easily carried out, and a time required for automatically adjusting the cameras 17a and 17b can be shortened. It is therefore possible to achieve more efficient and shorter measurement times.

Fifth Embodiment

Figure 11:
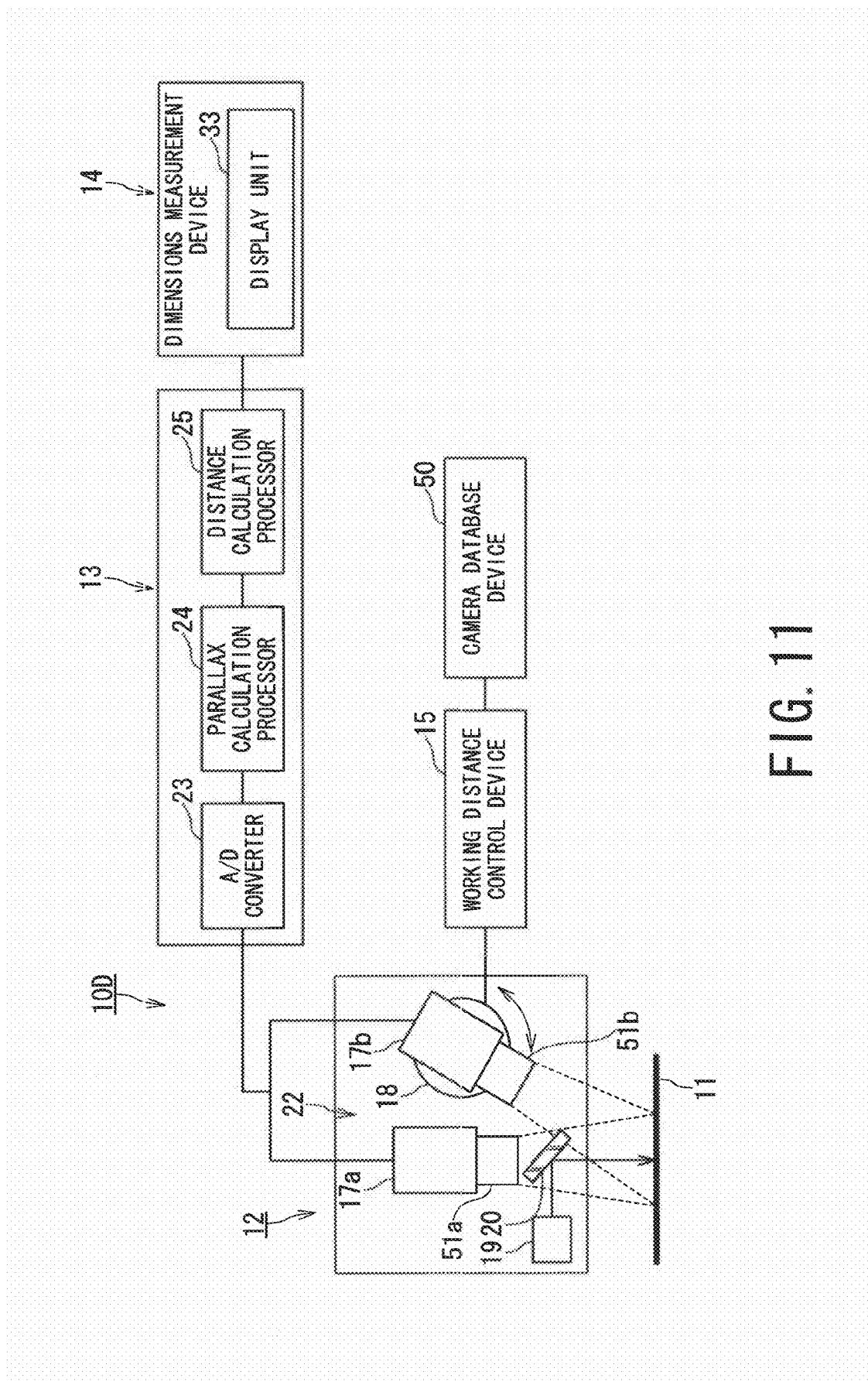
FIG. 11 is a configuration diagram illustrating a fifth embodiment of the inspection and measurement apparatus (fifth inspection and measurement apparatus) according to the present invention.

FIG. 11 is a block diagram of a configuration example that illustrates an apparatus (hereinafter, which will be simply referred to as "fifth inspection and measurement apparatus") 10D for inspecting and measuring the measurement object 11 as a fifth embodiment of the present invention.

The fifth inspection and measurement apparatus 10D illustrated FIG. 11 is a reactor core internal dimensions measurement apparatus. In FIG. 11, components that are the same as in the first inspection and measurement apparatus 10 described in the first embodiment are denoted by the same reference numerals, and duplicate descriptions thereof are omitted or simplified. The fifth inspection and measurement apparatus 10D described in the fifth embodiment is additionally provided with a camera database device 50 which is an example of a memory device that records and stores camera information relative to the first inspection and measurement apparatus 10 illustrated in FIG. 1.

The camera database device 50 is, for example, connected to the working distance control device 15. Focal positions of the camera lenses 51a and 51b in accordance with the parallax angle of the stereoscopically arranged cameras 17a and 17b are previously stored and recorded in the camera database device 50. When relative positions between the stereoscopically arranged cameras 17a and 17b are fixed, a point of intersection of the camera optical axes can be determined based on the parallax angle between the cameras 17a and 17b.

Next, the operations of the fifth inspection and measurement apparatus 10D are described.

In the fifth inspection and measurement apparatus 10D described in the fifth embodiment, the cameras 17a and 17b provided inside the distance measurement device 12 are drivingly controlled by the working distance control device 15 based on camera information stored in the camera database device 50. The working distance control device 15 rotationally controls the posture of the camera 17b and automatically adjusts the parallax angle between the cameras 17a and 17b so that the camera optical axes of the stereoscopically arranged cameras 17a and 17b intersect at the surface of the measurement target of the measurement object 11.

A configuration may also be adopted in which the working distance control device 15 controls the postures of the camera 17a and camera 17b, respectively, based on camera information stored in the camera database device 50, so that the camera optical axes intersect at the surface of the measurement target of the measurement object 11.

When posture control is performed for at least one of the cameras 17a and 17b, since the intersection position of the camera optical axes changes with respect to the cameras, it is necessary to adjust the focal length of the camera lenses 51a and 51b comprised by the cameras 17a and 17b and adjust the focus of the camera to a position at which the camera optical axes intersect.

When the relative positions of the cameras 17a and 17b provided in the distance measurement device 12 are fixed, an intersection position of the camera optical axes can be determined based on the parallax angle between the cameras 17a and 17b. Hence, focal lengths of the camera lenses 51a and 51b that are determined based on intersection positions of the camera optical axes in accordance with parallax angles between the cameras 17a and 17b are recorded in the camera database device 50, and the working distance control device 15 rotates the posture of the camera 17b by means of the driving device 18 to adjust the parallax angle between the cameras 17a and 17b and, at the same time, performs focal adjustment of the cameras 17a and 17b based on the correlation between the parallax angle between the cameras 17a and 17b recorded in the camera database device 50 and the focal lengths of the camera lenses 51a and 51b.

The fifth inspection and measurement apparatus 10D described in the fifth embodiment comprises the camera database device 50 that records a correlation between a parallax angle between stereoscopically arranged cameras 17a and 17b and focal lengths of the camera lenses 51a and 51b of the cameras 17a and 17b. It is therefore possible to automatically adjust the focus of the cameras 17a and 17b by means of focal lengths of the camera lenses 51a and 51b recorded in the camera database device 50 in accordance with the parallax angle between the cameras 17a and 17b. By means of this automatic adjustment of the cameras 17a and 17b, a distance measurement from the distance measurement device 12 to the measurement target of the measurement object 11 can be performed simply and easily and, further, a time required for automatic adjustment of the cameras can be reduced, and more efficient and shorter measurement times can be achieved.

The fifth inspection and measurement apparatus 10D shown in FIG. 11 comprises the cameras 17a and 17b. The parallax angle between the cameras 17a and 17b is adjusted by rotationally controlling the driving device 18 by means of the working distance control device 15 to rotate the posture of, for example, the camera 17b so that the camera optical axes of the camera 17a and the camera 17b intersect at the surface of the measurement target of the measurement object 11.

In this case, since the intersection position of the camera optical axis of the camera 17b changes with respect to the camera 17a, the focal positions of the camera lenses 51a and 51b comprised by the cameras 17a and 17b are adjusted and the focuses of the cameras are adjusted to the position at which the camera optical axes intersect. When the relative positions between the cameras 17a and 17b are fixed, an intersection position of the camera optical axes can be determined based on the parallax angle between the cameras 17a and 17b.

Therefore, focal positions of the camera lenses 51a and 51b that are determined based on intersection positions of the camera optical axes in accordance with parallax angles between the cameras 17a and 17b are recorded in the camera database device 50. The working distance control device 15 adjusts the parallax angle between the cameras 17a and 17b by rotating the posture of, for example, the camera 17b by means of the driving device 18, and at the same time focal adjustment of the cameras is performed based on the correlation between the parallax angle and the focal lengths of the camera lenses 51a and 51b recorded in the camera database device 50.

The fifth inspection and measurement apparatus 10D illustrated in FIG. 11 comprises the camera database device 50 that records the relation between a parallax angle between the cameras 17a and 17b and focal lengths of the camera lenses 51a and 51b. It is therefore possible to automatically adjust the focus of each camera by using focal lengths of the camera lenses 51a and 51b that are recorded in the camera database device 50 in accordance with the camera parallax angle. Accordingly, not only can distance measurement from the distance measurement device 12 to a measurement target of the measurement object 11 be performed with ease, but it is also possible to reduce a time required for automatic adjustment of the focus of the camera 17a and camera 17b and achieve more efficient and automatic measurement times.

Sixth Embodiment

Figure 12:
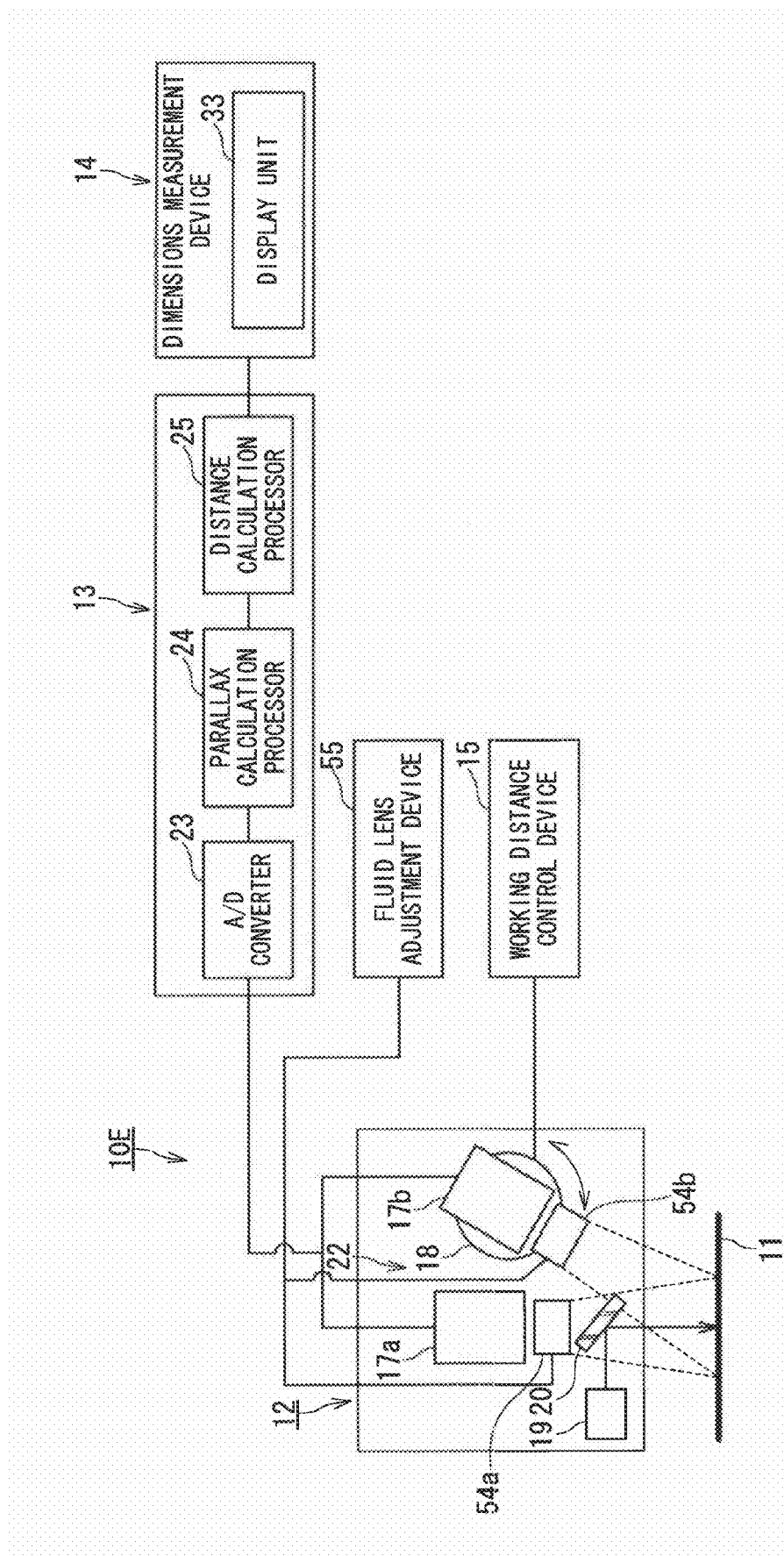
FIG. 12 is a configuration diagram illustrating a sixth embodiment of the inspection and measurement apparatus (sixth inspection and measurement apparatus) according to the present invention.

FIG. 12 is a block diagram of a configuration example that illustrates a sixth embodiment of the apparatus (hereinafter, which will be simply referred to as "sixth inspection and measurement apparatus") for inspecting and measuring an object to be measured according to the present invention.

An sixth inspection and measurement apparatus 10E described in this embodiment is a reactor core internal dimensions measurement apparatus for a nuclear reactor. In this embodiment, components that are the same as in the first inspection and measurement apparatus 10 described in the first embodiment are denoted by the same reference numerals, and duplicate descriptions thereof are omitted or simplified.

Relative to the first inspection and measurement apparatus 10 described in the first embodiment, in the sixth inspection and measurement apparatus 10E illustrated in FIG. 12, the camera lenses of the cameras 17a and 17b are changed to fluid lenses 54a and 54b, and a fluid lens adjustment device 55 that adjusts the fluid lenses 54a and 54b is additionally provided.

The sixth inspection and measurement apparatus 10E described in the sixth embodiment comprises the fluid lenses 54a and 54b for which the focal length is adjusted by electrical characteristics as the camera lenses of the cameras 17a and 17b provided in the distance measurement device 12. The fluid lenses 54a and 54b are electrically connected to the fluid lens adjustment device 55. The fluid lens adjustment device 55 can adjust the focal lengths of the two fluid lenses 54a and 54b to the same focal length by outputting a single electrical signal to the (for example, two) fluid lenses 54a and 54b of the stereoscopically arranged cameras 17a and 17b. It is possible to automatically adjust the fluid lenses 54a and 54b and adjust the camera field of view range of the cameras 17a and 17b, and to uniformly maintain the camera imaging conditions.

In the sixth inspection and measurement apparatus 10E described in the sixth embodiment, the stereoscopically arranged cameras 17a and 17b are provided in the distance measurement device 12 and, for example, the posture of the camera 17b is rotated to adjust the parallax angle between the cameras 17a and 17b so that the camera optical axes of the cameras 17a and 17b intersect at the surface of the measurement target of the measurement object 11. In this case, since the intersection position of the camera optical axis of the camera 17b changes relative to the camera 17a, it is necessary to adjust the focal length of the camera lenses (fluid lenses 54a and 54b) comprised by the cameras 17a and 17b, and align the focuses of the cameras 17a and 17b at a position at which the camera optical axes intersect. Because the size of camera lenses whose focal lengths can be remotely controlled is large, there is the problem that it is difficult to reduce the size of the distance measurement device 12. Further, even when using a mechanical adjustment apparatus such as the driving mechanism 18, there is similarly the problem that it is difficult to reduce the size of the distance measurement device 12.

The sixth inspection and measurement apparatus 10E according to the present embodiment comprises fluid lenses 54a and 54b for which the focal lengths can be adjusted by electrical characteristics as the camera lenses of the stereoscopically arranged cameras 17a and 17b. Regarding the two fluid lenses 54a and 54b of the respective cameras 17a and 17b, the focal lengths of the two fluid lenses 54a and 54b can be adjusted to the same focal length by a single electrical signal that is output from the fluid lens adjustment device 55 that is electrically connected to the two fluid lenses 54a and 54b. It is thus possible to adjust the fluid lenses 54a and 54b so that the field of view ranges of the camera 17a and camera 17b become the same, and to uniformly maintain the imaging conditions of the stereoscopically arranged cameras 17a and 17b.

According to the sixth inspection and measurement apparatus 10E, by using the fluid lenses 54a and 54b as camera lenses, provision of a mechanism that adjusts the focal lengths of lenses inside the distance measurement device 12 is no longer required, and it is possible to reduce the size and weight of the distance measurement device 12. Further, by adjusting the focal lengths of the stereoscopically arranged fluid lenses 54a and 54b by means of a single electrical signal, the imaging conditions between the two cameras 17a and 17b can be uniformly maintained, and calculation at the parallax calculation processor 24 is simplified.

Seventh Embodiment

Figure 13:
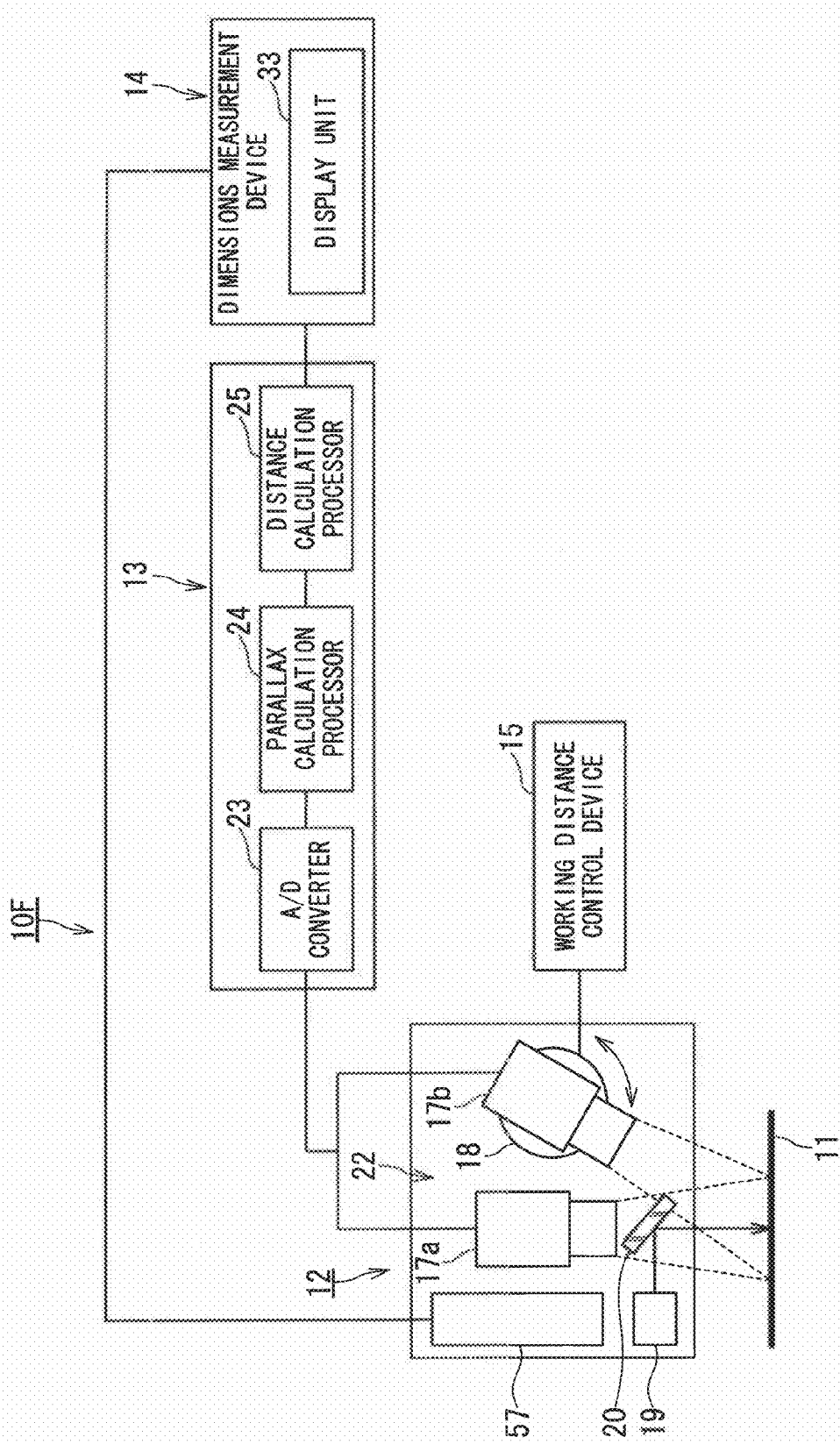
FIG. 13 is a configuration diagram illustrating a seventh embodiment of the inspection and measurement apparatus (seventh inspection and measurement apparatus) according to the present invention.
Figure 14:
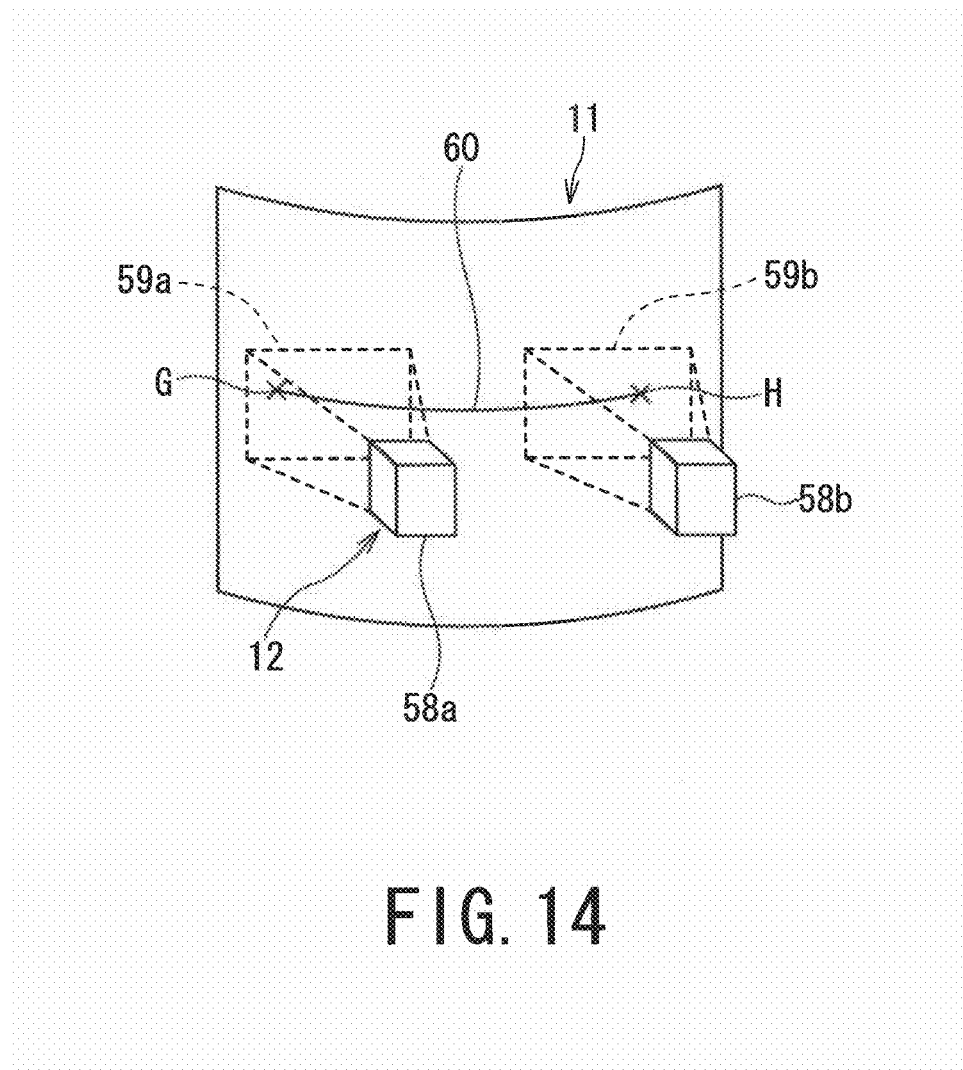
FIG. 14 is an explanatory view illustrating a dimensional measurement method that illustrates a seventh embodiment of the inspection and measurement apparatus (seventh inspection and measurement apparatus) according to the present invention.

FIG. 13 and FIG. 14 are block diagrams of configuration examples illustrating a seventh embodiment of the apparatus (hereinafter, which will be simply referred to as "seventh inspection and measurement apparatus") for inspecting and measuring an object to be measured according to the present invention.

For an seventh inspection and measurement apparatus 10F described in this (seventh) embodiment, components that are the same as in the first inspection and measurement apparatus 10 shown in FIG. 1 are denoted by the same reference numerals, and duplicate descriptions thereof are omitted or simplified. The seventh inspection and measurement apparatus 10F illustrated in FIG. 13 is additionally provided with a posture sensor 57 inside the distance measurement device 12 relative to the first inspection and measurement apparatus 10 shown in FIG. 1. The posture sensor 57 that is additionally provided in the distance measurement device 12 is capable of measuring a position and angle of the distance measurement device 12.

Next, operation of the seventh inspection and measurement apparatus 10F will be described.

According to the seventh inspection and measurement apparatus 10F, for example, the distance measurement device 12 is mounted on an underwater robot or the like, and is navigated by an unshown underwater robot through water inside a nuclear reactor to be disposed at a position for imaging of the measurement target of the measurement object 11. When the distance measurement device 12 is disposed at a required position, a two-dimensional optical pattern is projected onto the measurement target of the measurement object 11 by the light projector 19 comprised by the distance measurement device 12. The measurement target onto which the optical pattern is projected is then imaged with the stereoscopically arranged cameras 17a and 17b. A distance to the measurement target of the measurement object 11 is measured based on the images that are imaged.

The seventh inspection and measurement apparatus 10F comprises the posture sensor 57 inside the distance measurement device 12. The posture sensor 57 measures a position and imaging angle of the distance measurement device 12 that is disposed by the underwater robot or the like. For example, as shown in FIG. 14, first the distance measurement device 12 is disposed at a sensor position 58a, and the position and angle of the distance measurement device 12 at that time is measured by the posture sensor 57.

Next, the distance measurement device 12 is moved to and disposed at a sensor position 58b, and the posture and angle of the distance measurement device 12 is measured. A measurement range 59a is a measurement range of the distance measurement device 12 at the sensor position 58a, and a measurement range 59b is a measurement range thereof at the sensor position 58b.

Meanwhile, at the dimensions measurement device 14 comprising the seventh inspection and measurement apparatus 10F that inspects and measures the measurement object 11, a point G in the measurement range 59a at the sensor position 58a is set as a first designated position, and subsequently a point H in the measurement range 59b at the sensor position 58b is set as a second designated position. The dimensions measurement device 14 converts a measurement result at the sensor position 58b into relative coordinates with respect to a measurement result at the sensor position 58a based on a position and angle of the distance measurement device 12 that is measured with the posture sensor 57, and integrates the two measurement results into a measurement result at the same coordinate diameter. Thereafter, the dimensions measurement device 14 performs a dimensional measurement between the designated positions of G and H. By the dimensional measurement between the designated positions G and H, it is possible to accurately and efficiently measure the dimensions of a defect 60 or damage on the surface of the measurement target of the measurement object 11.

According to the seventh inspection and measurement apparatus 10F described in the seventh embodiment, by measuring a position and an angle of the distance measurement device 12, it is possible to measure dimensions of the measurement target of the measurement object 11 that does not fit within one field of view of the distance measurement device 12.

The seventh inspection and measurement apparatus 10F includes the distance measurement device 12. The distance measurement device 12 includes a posture measurement unit that measures a position and an angle thereof. Further, a result measured by the distance measurement device 12 at a different position is converted into relative coordinates based on a position and an angle of the distance measurement device 12 that are measured with the posture measurement member of the posture sensor 57 serving as the posture measurement unit, and dimensions of a measurement target of the measurement object 11 that does not fit within one field of view of the distance measurement device 12 can be measured.

The invention claimed is:

1. An apparatus for inspecting and measuring an object to be measured, the apparatus comprising:
   a distance measurement device that includes a light projection unit that projects a two-dimensional optical pattern onto a measurement target of an object to be measured, a plurality of imaging units, disposed in a stereoscopic arrangement, that image the measurement target of the object to be measured, and a driving unit configured to rotate a posture of at least one of the imaging units to control a parallax angle between the imaging units;
   a working distance control device that controls the driving unit and adjusts a position at which optical axes of the imaging units intersect by controlling focal lengths of the lenses based on correlation data that indicates a correlation between the parallax angle between the imaging units and focal lengths of lenses of the imaging units in accordance with the parallax angle between the imaging units; and
   a distance calculation device that includes a correspondence position calculation unit that determines a correspondence position at which a same region among images of the imaging units disposed in the stereoscopic arrangement is imaged, and a distance calculation unit that calculates a distance to a measurement target of an object to be measured based on a calculation result of the correspondence position calculation unit, the parallax angle between the imaging units, and focal lengths of the lenses that are controlled in accordance with the parallax angle between the imaging units.

2. The apparatus for inspecting and measuring an object to be measured according to claim 1, further comprising:
   on an object to be measured side of the imaging unit, a bandpass filter with which a transmitted wavelength is selected in accordance with a wavelength of light that is projected from the light projection unit.

3. The apparatus for inspecting and measuring an object to be measured according to claim 1, wherein the working distance control device controls the driving unit so that the optical axes of the imaging units intersect at a surface of the measurement target of the object to be measured, and a field of view range of the imaging unit is adjusted in accordance with a distance between the measurement target of the object to be measured and the distance measurement device.

4. The apparatus for inspecting and measuring an object to be measured according to claim 1, wherein the distance measurement device includes a working distance sensor that performs a point measurement with respect to a distance between the measurement target of the object to be measured and the distance measurement device, and wherein the working distance control device automatically controls the driving unit according to a distance that is measured with the working distance sensor.

5. The apparatus for inspecting and measuring an object to be measured according to claim 1, wherein the lenses of the imaging units are fluid lenses with which a focal position can be adjusted by electrical characteristics, and further comprising:

a fluid lens adjustment device that adjusts the fluid lenses of two imaging units disposed in the stereoscopic arrangement with a single electrical signal.

6. The apparatus for inspecting and measuring an object to be measured according to claim 1, further comprising:
a dimensions measurement device that measures dimensions along a surface of a measurement target of the object to be measured based on a calculation result calculated by the distance calculation device.

7. The apparatus for inspecting and measuring an object to be measured according to claim 6, wherein the distance measurement device includes a posture measurement unit that measures a position and an angle thereof, and the distance measurement device converts a result measured at a different position into relative coordinates based on a position and an angle of the distance measurement device that are measured with the posture measurement unit, and measures dimensions of a measurement target of the object to be measured that does not fit within one field of view of the distance measurement device.

8. An apparatus for inspecting and measuring an object to be measured, the apparatus comprising:
a distance measurement device that includes a light projection unit that projects a two-dimensional optical pattern onto a measurement target of an object to be measured, one imaging unit that images the measurement target of the object to be measured, an optical scanning unit that guides light from the measurement target of the object to be measured along a plurality of scanning light paths, and a driving unit that drivingly controls a reflection mirror provided in each scanning light path of the optical scanning unit;
a working distance control device that controls the driving unit to rotate a posture of the reflection mirror to arbitrarily adjust a parallax angle between the scanning light paths, and focal lengths of the lenses based on correlation data that indicates a correlation between the parallax angle between the scanning light paths and focal lengths of lenses of the imaging units in accordance with the parallax angle between the scanning light paths; and
a distance calculation device that has a correspondence position calculation unit that determines a correspondence position at which a same region is imaged among images of the imaging unit from the respective scanning light paths, and a distance calculation unit that calculates a distance to a measurement target of an object to be measured based on a calculation result of the correspondence position calculation unit, the parallax angle between the scanning light paths, and focal lengths of lenses of the imaging units in accordance with the parallax angle between the scanning light paths.

9. The apparatus for inspecting and measuring an object to be measured according to claim 8, wherein the optical scanning unit includes a shielding unit that controls transmittance and shielding of light on each scanning light path, and is set so as to switch between transmittance and shielding of light to be input to the imaging unit on each scanning light path by means of the shielding unit.

10. The apparatus for inspecting and measuring an object to be measured according to claim 8, further comprising:
on an object to be measured side of the imaging unit, a bandpass filter with which a transmitted wavelength is selected in accordance with a wavelength of light that is projected from the light projection unit.

11. The apparatus for inspecting and measuring an object to be measured according to claim 8, wherein the working distance control device controls the driving unit so that optical axes of the imaging unit intersect at a surface of the measurement target of the object to be measured, and a field of view range of the imaging unit is adjusted according to a distance between the measurement target of the object to be measured and the distance measurement device.

\* \* \* \* \*